(12) United States Patent
Ovsiannikov et al.

(10) Patent No.: US 7,768,563 B2
(45) Date of Patent: Aug. 3, 2010

(54) METHOD AND CIRCUIT FOR DETERMINING THE RESPONSE CURVE KNEE POINT IN ACTIVE PIXEL IMAGE SENSORS WITH EXTENDED DYNAMIC RANGE

(75) Inventors: Ilia Ovsiannikov, Studio City, CA (US); Kwang-Bo Cho, Los Angeles, CA (US); Michael Kaplinsky, Sierra Madre, CA (US)

(73) Assignee: Aptina Imaging Corp., Grand Cayman (KY)

( * ) Notice: Subject to any disclaimer, the term of this patent is extended or adjusted under 35 U.S.C. 154(b) by 429 days.

(21) Appl. No.: 11/785,546

(22) Filed: Apr. 18, 2007

(65) Prior Publication Data
US 2007/0195183 A1   Aug. 23, 2007

Related U.S. Application Data

(62) Division of application No. 10/633,673, filed on Aug. 5, 2003, now Pat. No. 7,456,884.

(51) Int. Cl.
*H04N 5/335* (2006.01)
*H04N 5/217* (2006.01)

(52) U.S. Cl. .................. 348/308; 348/241
(58) Field of Classification Search .......... 348/241, 348/243, 222.1, 308; 250/208.1
See application file for complete search history.

(56) References Cited

U.S. PATENT DOCUMENTS

| | | | |
|---|---|---|---|
| 5,926,214 A * | 7/1999 | Denyer et al. ............. 348/241 |
| 6,008,486 A | 12/1999 | Stam et al. | |
| 6,040,570 A | 3/2000 | Levine et al. | |
| 6,130,713 A | 10/2000 | Merrill | |
| 6,248,991 B1 | 6/2001 | Chen et al. | |
| 6,348,681 B1 | 2/2002 | Kindt et al. | |
| 6,501,064 B2 | 12/2002 | Kole | |
| 6,727,946 B1 * | 4/2004 | Zhao et al. ................ 348/308 |
| 6,859,227 B1 * | 2/2005 | Andersson et al. ......... 348/241 |
| 6,911,640 B1 * | 6/2005 | Bencuya et al. ......... 250/208.1 |
| 7,277,129 B1 * | 10/2007 | Lee ............................ 348/308 |
| 7,280,140 B2 * | 10/2007 | Henderson ................. 348/241 |
| 2004/0174450 A1 * | 9/2004 | Lee et al. ................... 348/308 |

OTHER PUBLICATIONS

Steven Decker et al., "A 256×256 CMOS Imaging Array with Wide Dynamic Range Pixels and Column-Parallel Digital Output", IEEE Journal of Solid-State Circuits, vol. 33, No. 12, Dec. 1998, pp. 2081-2091.
David X.D. Yang et al., "A 640×512 Image Sensor with Ultra Wide Dynamic Range Floating-Point Pixel-Level ADC", Electrical Engineering Department, Stanford University, Stanford, CA, Session No. 17, Nov. 1, 1998, pp. 1-11.

* cited by examiner

*Primary Examiner*—Jason Chan
*Assistant Examiner*—Nicholas G Giles
(74) *Attorney, Agent, or Firm*—Dickstein Shapiro LLP (57) ABSTRACT

An apparatus and method for measuring the breakpoint of a response curve representing the voltage output of an image array having an extended dynamic range. By flooding a light-opaque pixel with a charge and then applying an intermediate reset voltage to the pixel, the signal is read from the pixel and stored. The full reset voltage is applied to the pixel, and then the signal in the pixel is read and stored. The voltage output difference is the difference between the first and second stored signal. The voltage output difference is then used to determine the voltage of the knee point. Further, a conventional saturated pixel can be reset with an intermediate reset just prior to readout. The resulting signal can then be used to determine the voltage of the knee point.

27 Claims, 12 Drawing Sheets

METHOD AND CIRCUIT FOR DETERMINING THE RESPONSE CURVE KNEE POINT IN ACTIVE PIXEL IMAGE SENSORS WITH EXTENDED DYNAMIC RANGE

CROSS REFERENCE TO RELATED APPLICATIONS

The present application is a divisional of U.S. patent application Ser. No. 10/633,673, filed on Aug. 5, 2003 now U.S. Pat. No. 7,456,884, the disclosure of which is incorporated by reference in its entirety.

The present invention relates generally to imager array operation, and more specifically, to circuits and methods for changing the dynamic range of an imager array.

BACKGROUND OF THE INVENTION

Figure 1:
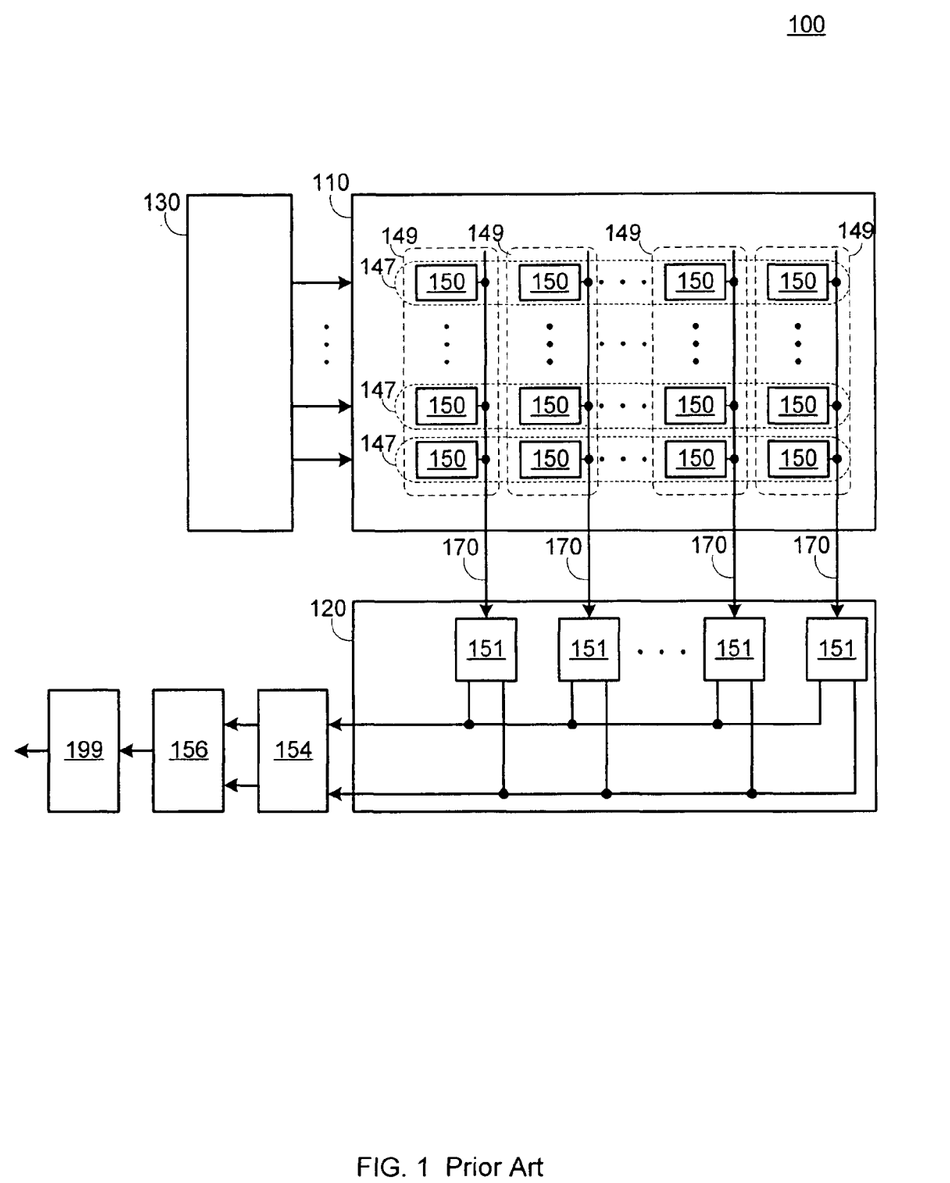
FIG. 1 is a block diagram of a conventional CMOS image array and associated circuitry.

There is a current interest in CMOS active pixel imagers for use as low cost imaging devices. FIG. 1 shows a conventional CMOS active pixel sensor imager array circuit 100 including a pixel array 110 and associated circuitry. Circuit 100 includes an array 110 of pixels 150 and a row decoding/controlling circuit 130 and a column address/decoding/readout circuit 120 which provide timing and control signals to enable reading out of signals stored in the pixels 150 in a manner commonly known. The array 110 has columns 149 and rows 147 of pixels 150. Exemplary arrays 110 have dimensions of M times N pixels 150, with the size of the array 110 depending on a particular application. The imager 100 is read out a row 147 at a time using a column parallel readout architecture. The row circuit 130 selects a particular row 147 of pixels 150 in the array 110 by controlling the operation of row addressing and row drivers (not shown) within the row circuit 130. Charge integration signals stored in the selected row of pixels 150 are provided on the column lines 170 to a column circuit 120, in a manner described below, and sampled and stored in column buffer circuits 151. The pair of signals corresponding to the read out reset signal and integrated charge signal (e.g., Vrst, Vsig) are provided by the column buffer circuits 151 to a differential amplifier circuit 154. The differential amplifier circuit 154 provides the differential output of the pixel signals (e.g., Vrst, Vsig) to the analog-to-digital (ADC) circuit 156. The ADC circuit 156 provides a digital value representing the signal of the pixel 150 output to associated circuitry 199. Associated circuitry 199 is representative of the many circuits that receive the input from the ADC circuit 156 and perform operations on the input. For example, associated circuitry 199, may store, transfer to a bus/memory, and perform linear/non-linear operations on the signal input.

Figure 2:
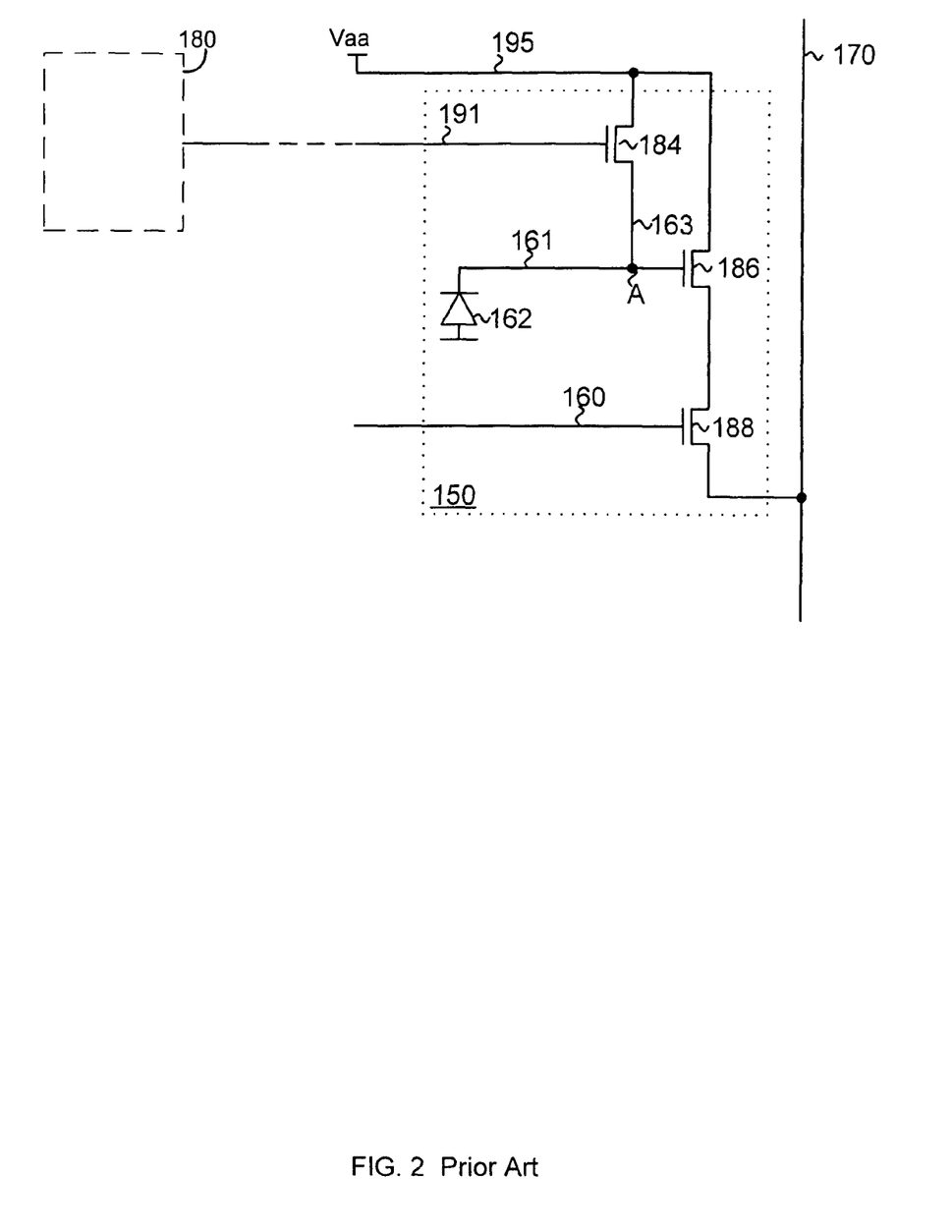
FIG. 2 is a block diagram of a conventional three transistor pixel cell of the FIG. 1 CMOS image array.

A pixel 150 of the CMOS active pixel sensor imager array 100 is shown in greater detail in FIG. 2. Pixel 150 can have one or more active transistors within the pixel unit cell, can be made compatible with CMOS technologies, and promises higher readout rates compared to passive pixel sensors. The FIG. 2 pixel 150 is a 3T APS, where the 3T is commonly used in the art to designate use of three transistors to operate the pixel. A 3T pixel has a photodiode 162, a reset transistor 184, a source follower transistor 186, and a row select transistor 188. It should be understood that while FIG. 2 shows the circuitry for operation of a single pixel 150, in practical use there will be an M times N array of identical pixels 150 arranged in rows and columns with the pixels 150 of the array 110 accessed using row and column select circuitry, as described above.

The photodiode 162 converts incident photons to electrons which collect at node A. A source follower transistor 186 has its gate connected to node A and amplifies the signal appearing at node A. When a particular row-containing cell 150 is selected by a row selection transistor 188, the signal amplified by transistor 186 is passed on a column line 170 to the readout circuitry. The photodiode 162 accumulates a photo-generated charge in a doped region of the substrate. It should be understood that the pixel 150 might include a photogate or other photoconversion device, in lieu of a photodiode, for producing photo-generated charge.

A reset voltage source Vrst, typically Vaa, on line 195 is selectively coupled through reset transistor 184 to node A. The row select control line 160 is coupled to all of the pixels 150 of the same row of the array. Voltage source Vaa is coupled to a source following transistor 186 and its output is selectively coupled to a column line 170 through row select transistor 188. Although not shown in FIG. 1, column line 170 is coupled to all of the pixels of the same column of the array and typically has a current sink at its lower end. The gate of row select transistor 188 is coupled to row select control line 160.

The gate of reset transistor 184 is coupled to reset control circuit 180 through reset control line 191. Reset control circuit 180 serves to control the reset operation in which Vrst is coupled to node A. Reset control circuit 180 may provide a plurality of control signals to the reset transistor 184, e.g., the reset control circuit 180 provides a full and an intermediate reset signal to reset transistor 184. Reset control circuit 180 is mutually coupled to the reset transistor 184 of each pixel 150 in the row 147. Each row 147 of pixels 150 has an associated reset control circuit 180.

As known in the art, a value is read from pixel 150 in a two-step process. During a charge integration period, the photodiode 162 converts photons to electrons which collect at the node A. The charges at node A are amplified by source follower transistor 186 and selectively passed to column line 170 by row access transistor 188. During a reset period, node A is reset by turning on reset transistor 184 and the reset voltage is applied to node A and read out to column line 170 by the source follower transistor 186 through the activated row select transistor 188. As a result, the two different values—the reset voltage Vrst and the image signal voltage Vsig—are readout from the pixel and sent by the column line 170 to the readout circuitry where each is sampled and held for further processing as known in the art.

Figure 3:
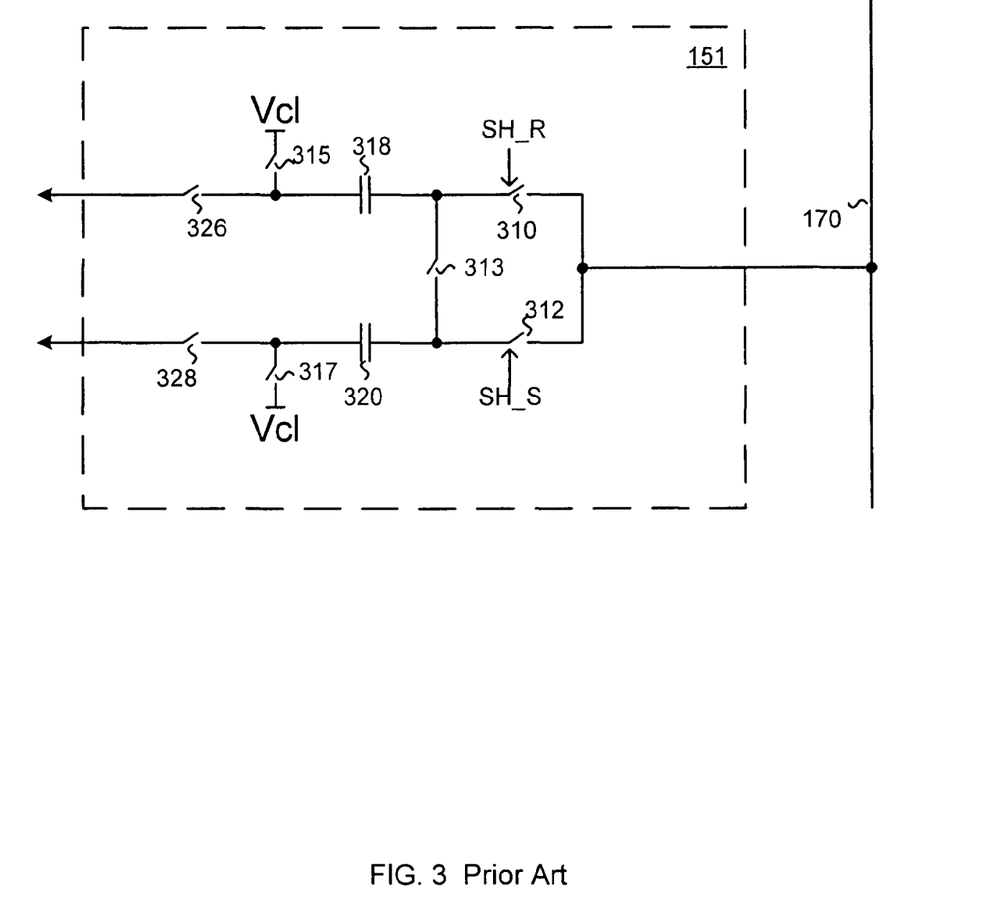
FIG. 3 is a block diagram of a conventional column buffer circuit of the FIG. 1 CMOS image array.

FIG. 3 more clearly shows the column buffer circuit 151 of FIG. 1 that is capable of sampling and holding and then providing two sampled values, e.g., Vsig and Vrst values, for subsequent use by a down stream circuit (FIG. 1). As seen in FIG. 3 the column line 170 is switchably coupled through SH_R switch 310 to the first side of capacitor 318. The second side of capacitor 318 is switchably coupled through switch 326 to a downstream circuit. The column line 170 is also switchably coupled through SH_S switch 310 to the first side of capacitor 320. The second side of capacitor 320 is switchably coupled through switch 328 to a downstream circuit. The first side of capacitor 318 is switchably coupled through switch 313 to the first side of capacitor 320. A clamp voltage Vcl is switchably coupled through switch 315 to the second side of capacitor 318. A clamp voltage Vcl is also switchably coupled through switch 317 to the second side of capacitor 320.

The conventional CMOS imager array 100 (FIG. 1) has a limited dynamic range and is prone to over-saturation from receiving a very high light intensity. As is known in the art, the dynamic range of a pixel array can be increased by implementation of an extended dynamic range (XDR) technique, where a modified reset signal is applied to the gate of the reset transistor. The modified reset signal, referred to as an intermediate reset value, has a different, typically smaller, amplitude than the "full reset" signal asserted at the start of each integration period. The intermediate reset value will affect only those cells on which a strong light signal is incident. Only if a photocurrent has reduced the voltage across a cell's photodiode to below a certain level at the time the intermediate reset value is asserted, then the voltage across the photodiode will be pulled up to Vdac=Vxdr−Vth, where Vxdr is the voltage, i.e., of the intermediate voltage, on the reset line 191 (FIG. 2) and Vth is the threshold voltage of the reset transistor (e.g., reset transistor 184 of FIG. 2). In accordance with the XDR technique, during each integration period, the intermediate reset value is applied to the gate of each of the reset transistors in the row.

Figure 4:
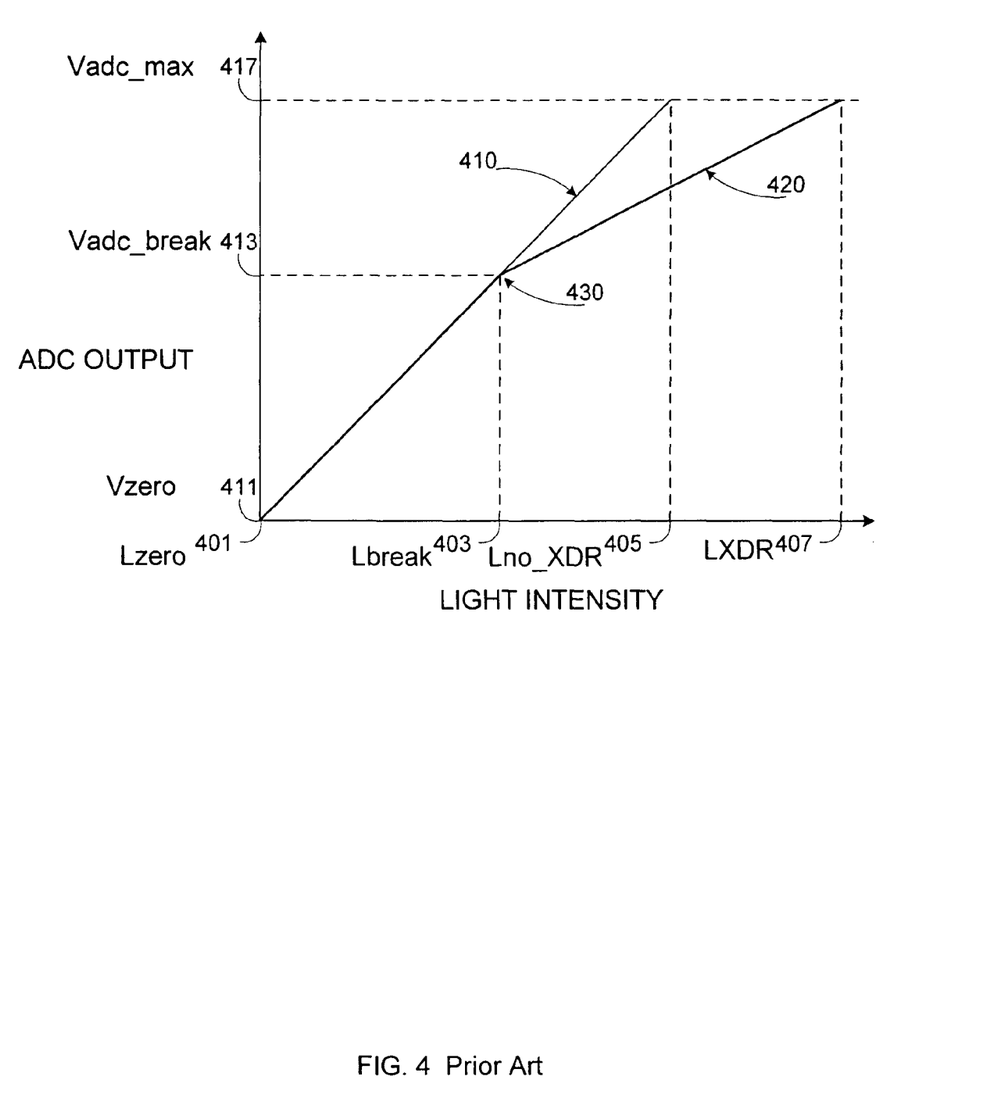
FIG. 4 is a graph depicting a conventional knee-point curve comparing Vadc with light intensity.

FIG. 4 depicts a Vadc output of an upstream pixel from an imager system when the XDR technique is applied. By applying an intermediate reset value during the integration period, the response curve of the image sensor is converted from a linear curve to a piecewise linear curve, as illustrated in FIG. 4.

The vertical axis of FIG. 4 represents digital data output from circuit 156 (FIG. 1), i.e., an ADC amplifier 156, as a result of a read of an upstream pixel 150 of the imager 100 (FIG. 1). The Vzero 411 axis represents a zero ("0") Vadc output. The Vadc_break 413 axis represents a Vadc output of the kneepoint (e.g., the break point). The Vadc_max 417 axis represents a maximum Vadc output of a pixel 150, e.g., the saturation point. The horizontal axis in FIG. 4 represents incident light intensity on the cell during the integration period. The Lzero 401 axis represents a zero ("0") light intensity output. The Lbreak 403 axis represents a light intensity output of the kneepoint. The Lno_XDR 405 axis represents a maximum light intensity output of a pixel 150 if an XDR technique is not applied, e.g., the saturation point of the pixel without an extended dynamic range. The LXDR 407 axis represents a maximum light intensity output of a pixel 150 if an XDR technique is applied, e.g., the saturation point of the pixel with an extended dynamic range.

Curve 410 represents the response curve of pixel 150 (FIG. 1), indicating the range of detectable incident light intensity (from Lzero 401 to Lno_XDR 405) corresponding to the full range of the output of ADC amplifier 156 (FIG. 1), from Vzero 411 to Vadc_max 417, when no intermediate reset signal is asserted during the integration period. Curve 420 of FIG. 4 represents the response curve of the pixel 150, indicating the extended range of detectable incident light intensity (from Lzero 401 to LXDR 407, where intensity LXDR 407 is greater than Lno_XDR) corresponding to the full range of the output of ADC amplifier 156, when an intermediate reset signal is asserted during the integration period. The break point 430 represents the change in the response of pixel 150 to light intensity after an intermediate pulse signal is provided, i.e., after the XDR technique is applied. At breakpoint 430, the response curve changes from the non-extended range light intensity curve 410 to the extended range light intensity curve 420.

FIG. 4 illustrates how the XDR technique extends the dynamic range of the image sensor, namely by increasing the maximum detectable light intensity from Lno_XDR 405 to LXDR 407. The coordinates of the breakpoint (403, 413) depend on the photodiode voltage immediately after an XDR reset (Vdac=Vxdr−Vth) and the time at which the XDR reset is performed during the integration period. It is possible to perform two or more intermediate resets in a single integration period, which results in a piecewise linear sensor response curve having N+1 linear sections, and N breakpoints (one breakpoint for each of N intermediate resets), and can (in some cases) increase the dynamic range beyond that achievable with only one intermediate reset per integration period.

When implementing the XDR technique, the voltage supplied to the reset line 191 (FIG. 2) can be generated using a DAC (digital-to-analog converter). The imager 100 (FIG. 1) can be programmed with a desired intermediate voltage level and the time at which each XDR reset is performed.

Figure 5:
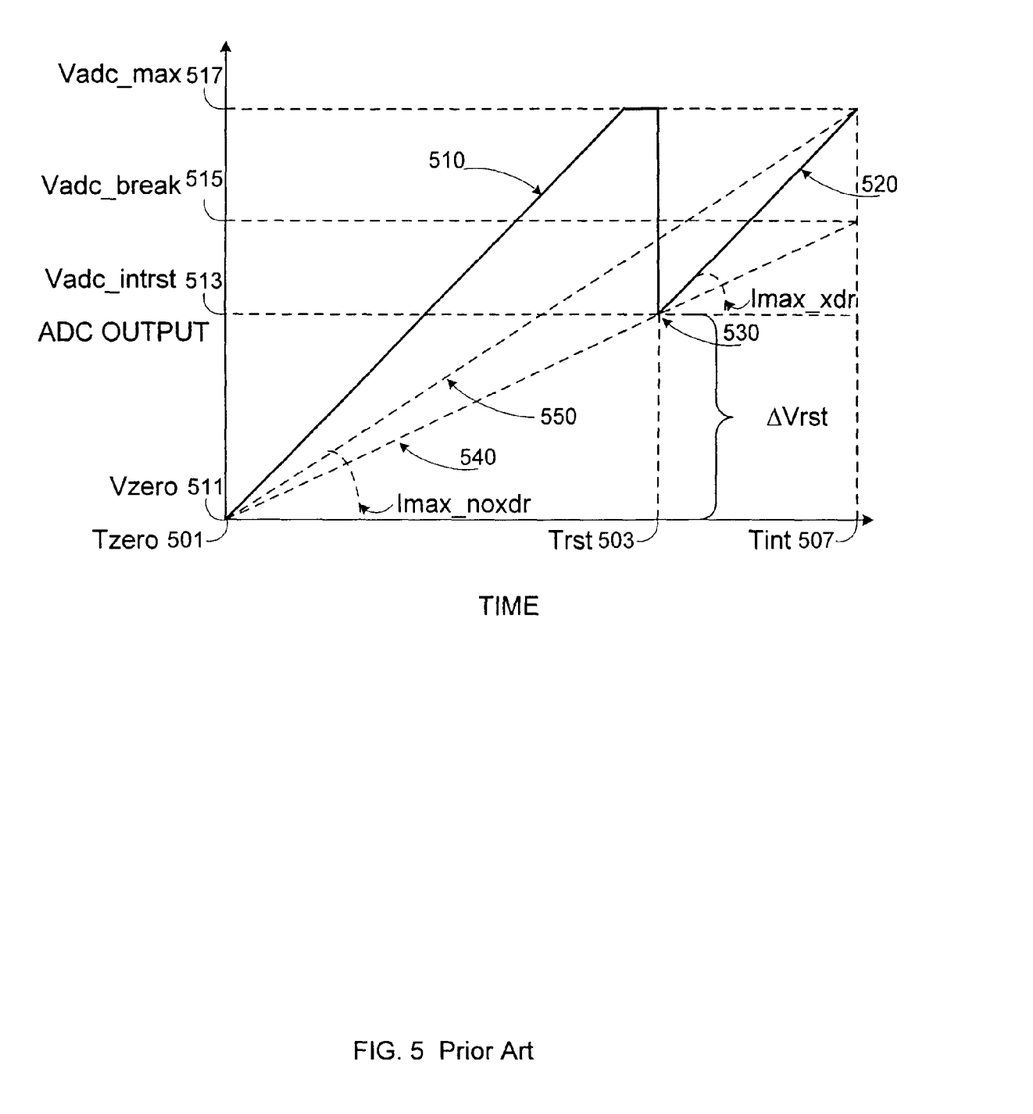
FIG. 5 is a graph depicting a conventional curve comparing Vadc over time.

FIG. 5 illustrates how the XDR technique affects the digital output from an ADC circuit 156 (FIG. 1) of an upstream pixel cell 150 over time. The vertical axis of FIG. 5 represents voltage data output from circuit 156 (FIG. 1), i.e., an ADC amplifier 156, as a result of a read of an upstream pixel 150 of the circuit 100 (FIG. 1).

The Vzero 511 axis represents a zero ("0") Vadc output. The Vadc_break 515 axis represents a Vadc output of the kneepoint. The Vadc_max 517 axis represents a maximum Vadc output of a pixel 150, e.g., the saturation point.

The horizontal axis in FIG. 5 represents time. The Tzero 501 axis represents time zero ("0"). The time Trst 503 axis represents the time of the kneepoint, e.g., the time that the intermediate reset voltage is applied. The time Tint 507 axis represents the total integration time of a pixel 150, regardless whether a XDR technique is applied, e.g., the saturation point of the pixel with an extended dynamic range.

Curve 550 represents the response curve of pixel 150 (FIG. 1) when the XDR mode is disabled and the intermediate reset is not applied. The slope of curve 550 (i.e., dV/dt) is proportional to the photocurrent of pixel 150 and the intensity of light incident on pixel 150. As drawn, curve 550 corresponds to the maximum light intensity that can be sensed by pixel 150 without saturation when XDR is off, Imax_noxdr. Any curve with a steeper slope, like curve 510, will cause the output of pixel 150 to saturate at Vadc_max 517.

Curves 510 and 520 represent the response curve of pixel 150 when the XDR mode is enabled. Any pixel 150 receiving more light than that represented by curve 540 will be affected by the intermediate reset. While a full reset would cause integration to restart from Vzero, the intermediate reset restarts integration from Vadc_intrst 513 and continues for a duration of (Tint-Trst). During this second period of integration the maximum light intensity that will not cause pixel saturation is represented by the slope of curve 520, Imax_xdr.

Curve 510 represents the response curve of pixel 150 (FIG. 1) indicating the range of time (from Tzero 501 to Trst 503) corresponding to the full range of the output of the ADC amplifier 156 (from Vzero 511 to Tint 517), when no intermediate reset signal is asserted during the integration period. Curve 520 of FIG. 5 represents the response curve of pixel 150, indicating the extended range of time, Tint (from Trst 503 to Tint 507, where Tint 507 is greater than Trst 503) corresponding to the full range of output of the ADC amplifier 156 when an intermediate reset signal is asserted during the integration period at the breakpoint time period Trst 503.

Point 530 shows that, upon application of the intermediate reset signal, the response of pixel 150 to photon integration changes. At time period 503, the response curve changes from the non-extended range voltage output curve 510 to the extended range voltage output curve 520. The Vadc_instr 513 represents the change in Vrst that is provided, i.e., the full reset value offset by the intermediate reset value.

FIG. 5 illustrates how the XDR technique extends the dynamic range of the image sensor, namely by increasing the maximum amount of exposure for the pixel 150 without causing the signal from the pixel 150 being over saturated.

A pixel array with an XDR system can be programmed to provide a desired kneepoint by specifying the desired Trst (i.e., intermediate reset time) and intermediate reset voltage Vrst. However, within sensor circuitry are inherent sources of variation affecting absolute signal magnitudes. Although a XDR system is designed to provide intermediate and full reset voltages, process variation can affect the provided voltage, resulting in actual intermediate and full reset voltages, which are different from the desired intermediate and full reset voltages. Therefore, the desired knee point may differ from the actual knee point.

The knee point corresponds to the time when the intermediate reset voltage is applied and the voltage output from the pixel at the break point, i.e., Vadc_break. The knee point can be determined by first determining the difference between the full reset voltage and the intermediate reset, i.e., $\Delta Vrst$. Since values of Trst and Tint are pre-determined, Vadc_break can be calculated once $\Delta Vrst$ is determined, where:

$$Vadc\_break = (Tint/Trst) * \Delta Vrst \quad (1).$$

However, it is unknown how to determine the actual difference between the full reset voltage and the intermediate reset, i.e., $\Delta Vrst$. Consequently, it is not been known how to determine the actual knee point of the response curve. Thus, it would be desirable to be able to determine the actual knee point of the response curve.

SUMMARY OF THE INVENTION

The present invention provides a method and apparatus for determining the knee point of a response curve of an image array applying an extended dynamic range technique.

In a first exemplary embodiment, the knee point is determined by first flooding the pixel artificially by coupling the light sensitive node pixel to ground. Then an intermediate reset voltage is applied to the pixel and the signal in the pixel is sampled and held. Subsequently, a full reset voltage is applied to the pixel, and the signal in the pixel sampled and held. Using the two signals from the pixel, the difference between the intermediate and full reset value is determined. The pixel is either light opaque or shielded from incident light.

In another exemplary embodiment, the knee point is determined by sampling and storing the signal values from the image array without applying the XDR technique. The signal values of saturated pixels are recorded. Then, the image array is sampled and stored applying the XDR technique, where the intermediate reset voltage is applied at a time Trst, where Trst is substantially equivalent to Tint. The difference between the intermediate and full reset value is determined by comparing the difference between the signal values of saturated pixels from the initial readout of the pixel array and the signal values of the corresponding pixels from the subsequent readout of the pixel array.

BRIEF DESCRIPTION OF THE DRAWINGS

These and other features and advantages of the invention will be more readily understood from the following detailed description of the invention which is provided in connection with the accompanying drawings, in which.

DETAILED DESCRIPTION OF THE INVENTION

Figure 6:
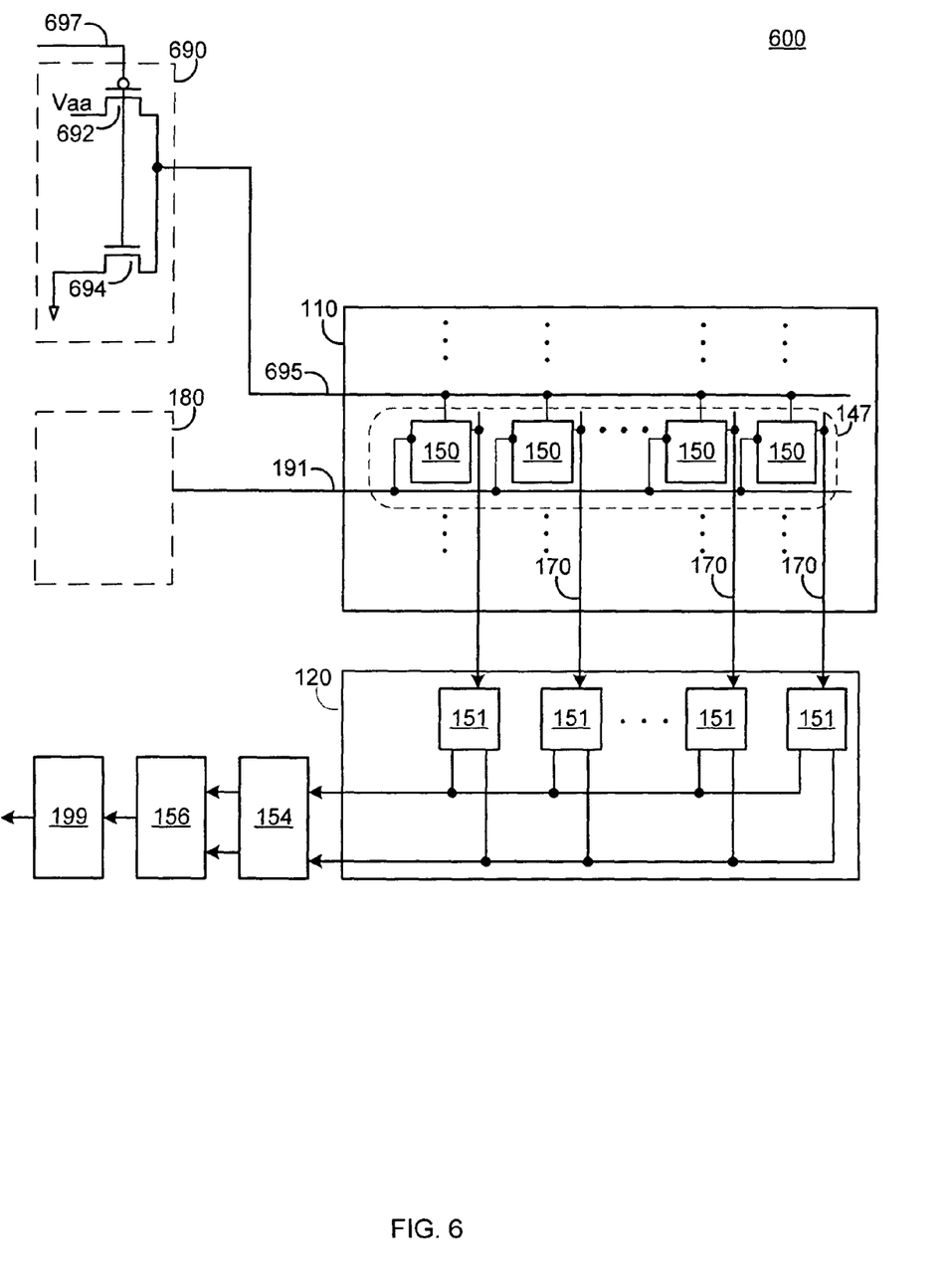
FIG. 6 is a block diagram of a CMOS image array and associated circuitry in accordance with an exemplary embodiment of the invention.

FIG. 6 depicts a CMOS active pixel sensor imager array circuit 600 including associated circuitry according to an exemplary embodiment of the present invention. Circuit 600 differs from circuit 100 in that circuit 600 includes a power supply circuit 690. Power supply circuit 690 mutually couples line 695 either to a reset voltage Vaa or to ground. Power supply circuit 690 is mutually coupled to the reset transistor 184 (FIG. 2) of each pixel 150 in the row 147. The row 147 of pixels 150 is representative of many rows 147 of pixels 150 in the array 110 (similar to FIG. 1) though only one row 147 of pixels 150 is shown. Each row 147 of pixels 150 has an associated power supply circuit 690. The pixel 150 is shielded from incident light.

Within the power supply circuit 690, line 695 is mutually coupled to a first source/drain of respective transistors 692, 694. The other source/drain of transistor 692 is coupled to a Vaa voltage. The other source/drain of transistor 694 is coupled to ground. A signal line 697 is coupled to the gate of transistor 694 and inversely coupled to the gate of transistor 692; thus, only one of transistors 692, 694 is closed (i.e., conductive) at a time. Depending on the signal carried on line 697, line 695 is either coupled to Vaa or ground. For example, if the signal carried on line 697 is logic high, then transistor 692 is open and non-conductive, and transistor 694 is closed and conductive. Alternatively, if the signal carried on line 697 is logic low, then transistor 694 is open and non-conductive, and transistor 692 is closed and conductive. Therefore, power supply circuit 690 either provides a Vaa voltage to the row 147 of pixels 150, or connects row 147 to ground.

Figure 7:
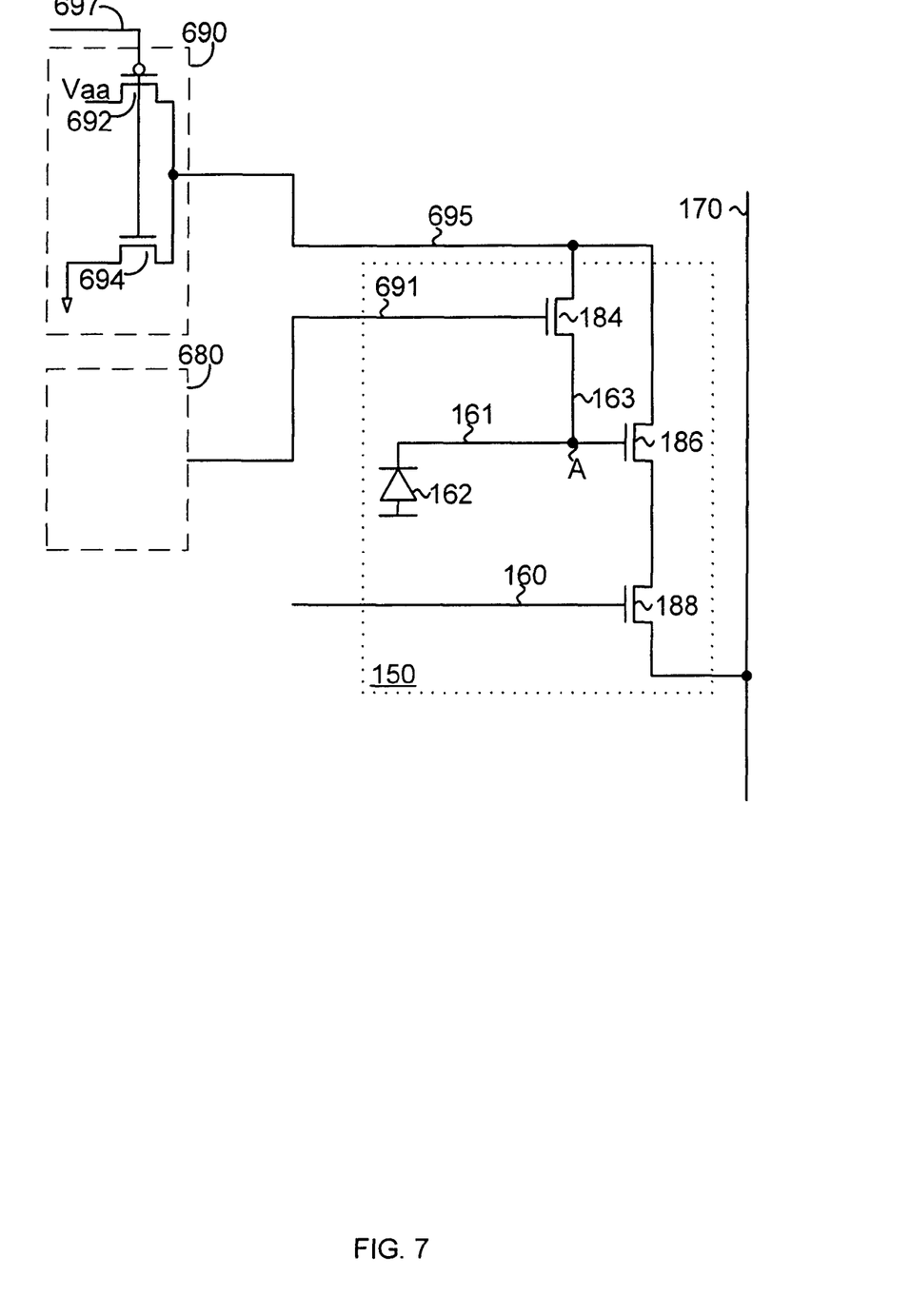
FIG. 7 is block diagram showing a portion of the FIG. 6 diagram in greater detail.

FIG. 7 is block diagram showing a portion of the FIG. 6 diagram in greater detail. FIG. 7 depicts pixel 150 being coupled to the power supply circuit 690. More specifically, power supply circuit 690 is coupled through line 695 to the reset transistor 184 and source follower transistor 186. FIG. 7 also depicts pixel 150 being coupled to the reset control circuit 680 through reset control line 691.

Figure 8:
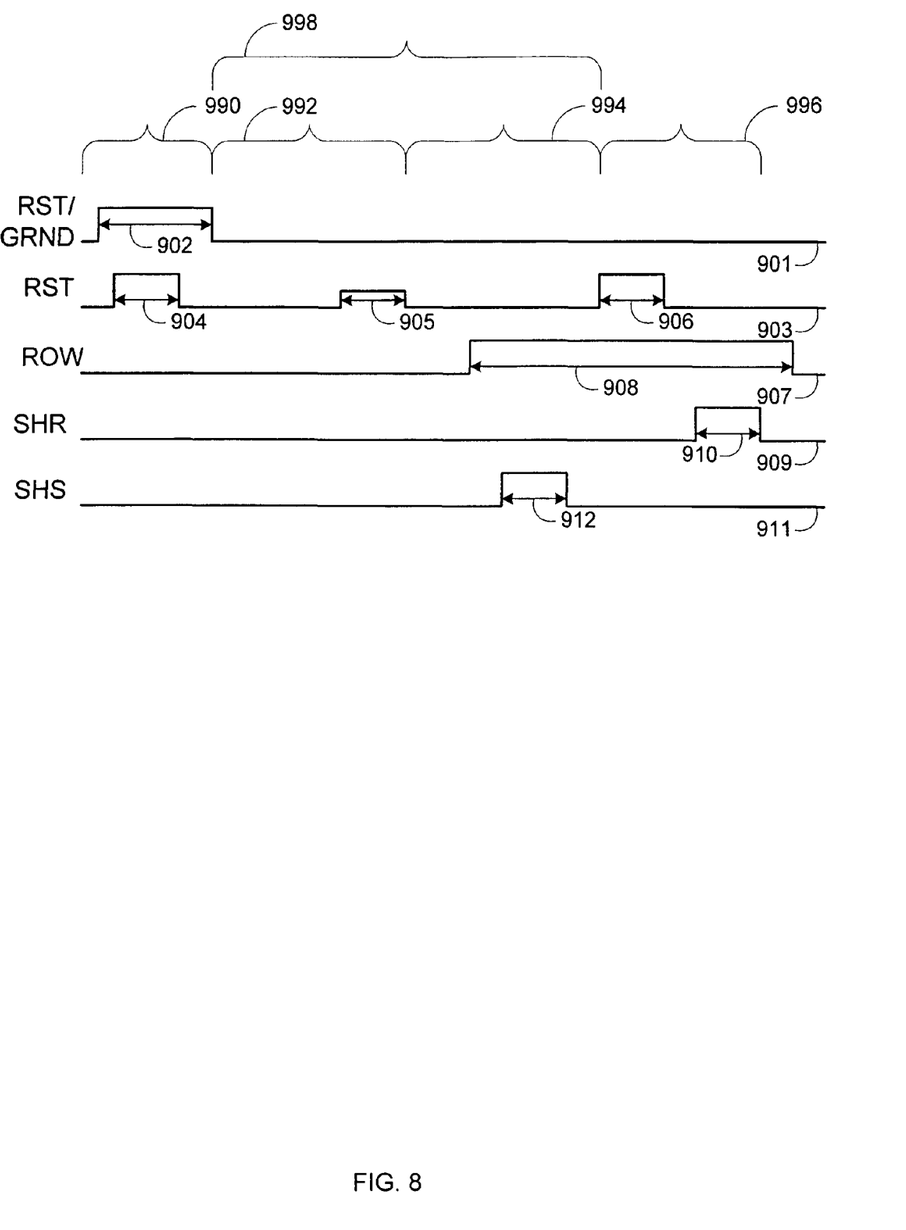
FIG. 8 is a simplified timing diagram associated with the operation of the circuitry of FIG. 6.

Turning to FIG. 8, the basic operation of the circuits of FIGS. 3, 6, and 7 is now described with reference to sampling and storing a set of signals from a pixel 150, where the two signals that are applied are the full reset value and the intermediate reset value. With reference to FIGS. 3, 6, and 7, the control signals are shown over defined time intervals 990, 992, 994, and 996.

The first time interval 990 is a flood time interval. During time interval 990, the light sensitive node of pixel 150 is coupled to ground, thereby flooding pixel 150 with a negative charge to force saturation, e.g., removing any stored signal from the pixel 150. The second time interval 992 is a Trst time interval. During Trst interval 992, the intermediate reset signal is provided to the pixel 150, a corresponding voltage is coupled to the pixel 150, and the pixel 150 is reset with respect to the intermediate reset value. The third time interval 994 is a Tint2 time interval. During the Tint2 time interval 994, the voltage value stored at node A (FIG. 7) is sampled and stored in capacitor 320 of column circuit buffer 151 (FIG. 3). The combined time intervals 992 and 994 comprise the Tint time interval 998. The fourth time interval 996 is a post-Tint time interval. During post Tint time interval 996, a full value reset signal is provided to the pixel 150 and a corresponding voltage is coupled to the pixel 150, and the pixel 150 is charged with respect to the full reset value. Also, during the post Tint time interval 996, the voltage value stored at node A (FIG. 7) is sampled and stored in capacitor 318 of column circuit buffer 151 (FIG. 3).

Throughout FIG. 8, a logic high signal indicates that the corresponding transistor of FIGS. 3, 6, and 7 is closed (conductive), while a logic low signal indicates that the corresponding transistor of FIGS. 3, 6, and 7 is open (non-conductive).

RST/GRND signal 901 corresponds to the logic level of transistor 694 and the inverse logic level of transistor 692 in power supply circuit 690 (FIG. 6). RST signal 903 corresponds to the logic level of reset transistor 184 in pixel 150 (FIG. 7). ROW signal 907 corresponds to the logic level of row select transistor 188 in pixel 150 (FIG. 7). SHR signal 909 corresponds to the logic level of sampling switch 312 in column buffer circuit 151 (FIG. 3). SHS signal 911 corresponds to the logic level of sampling switch 310 in column buffer circuit 151 (FIG. 3).

During time interval 902, transistor 692 opens and transistor 694 closes to couple line 695 to ground. During a time interval 904, transistor 184 is provided a full reset value and is closed to couple pixel 150 to ground; thereby, flooding pixel 150 with a negative charge. Time interval 902 begins before time interval 904 begins, and time interval 902 ends after time interval 904 ends. After time interval 902 ends transistor 692 is closed and transistor 694 opens to couple line 695 to Vaa.

During time interval 905, transistor 184 is provided an intermediate reset value and partially closes to couple pixel 150 to Vaa through line 695; thereby, providing an intermediate Vaa voltage to pixel 150. During time interval 908, row transistor 188 closes to couple node A of pixel 150 to column buffer circuit 151 through column line 170. Time 908 begins before the earlier of either time intervals 910, 912 begins, and ends after the later of time intervals 910, 912 ends. Time interval 908 begins after time interval 905 ends.

During time interval 912 sampling switch 312 closes, coupling pixel 150 through line 170 to charge capacitor 320 with the value stored in pixel 150. Time interval 912 begins after time interval 908 begins and ends before time interval 906 begins. During time interval 906, transistor 184 is provided a full reset value and closes to couple pixel 150 to Vaa through line 695, thereby providing a full Vaa voltage to pixel 150. Time interval 906 begins after time interval 912 ends and ends before time interval 910 begins.

During time interval 910, sampling switch 310 closes, coupling pixel 150 through line 170 to charge capacitor 318 with the value stored in pixel 150; where the value stored in pixel 150 is substantially equivalent to the full reset value. Time interval 910 begins after time interval 906 ends and ends before time interval 908 ends. Thus, the set of signals, i.e., the intermediate reset value and the full reset value, from the pixel 150 are stored in the column buffer 151. (FIG. 3)

After the set of signals are stored in the column buffer circuit 151, they are provided to the differential amplifier 154, which in turn, provides the outputted, differentiated signals to the ADC amplifier 156. (FIG. 6) The ADC amplifier 156 then provides an output voltage signal. The output voltage signal represents the difference between the provided full reset voltage and the provided intermediate reset voltage. Given that voltage at the break point is related to the integration time of the pixel and the difference between the full reset voltage and the intermediate reset voltage, the voltage at the break point is computed as:

$$\begin{aligned} Vbreakpoint &= \text{Vadc\_break} \\ &= (\text{Integration time}/\text{Break point time}) * \\ &= \begin{pmatrix} \text{the difference between the} \\ \text{full reset voltage and} \\ \text{the intermediate reset voltage} \end{pmatrix} \\ &= (\text{Tint}/\textit{Trst}) * \Delta Vrst \end{aligned} \quad (2)$$

Since Tint and Trst are known and $\Delta$Vrst is provided by the ADC amplifier, the kneepoint can be determined.

In another aspect of the present invention, pixel 150 is located in a redundant area of the array 110.

Figure 9:
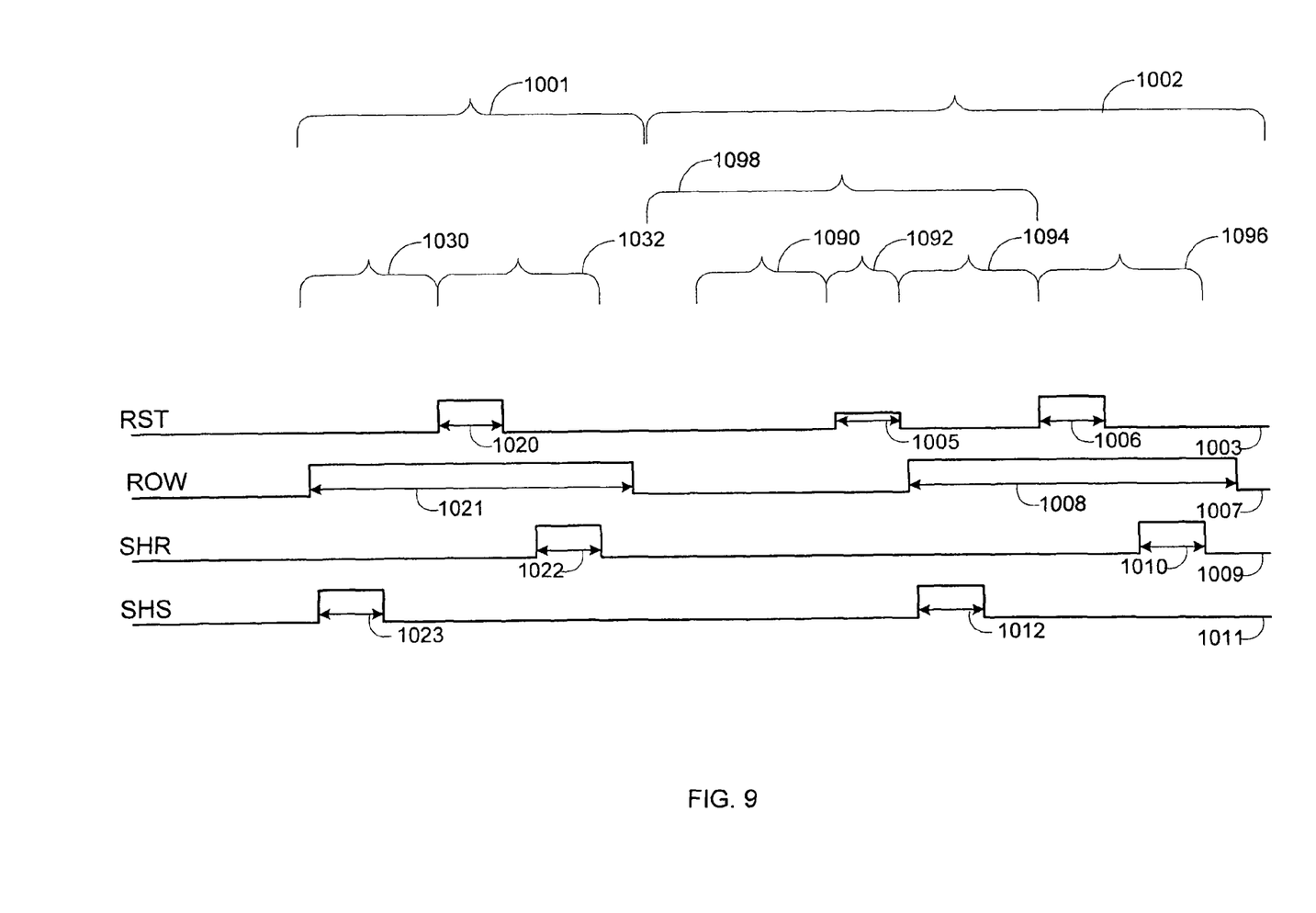
FIG. 9 is a simplified timing diagram associated with the operation of the circuitry of FIG. 1 in accordance with another exemplary embodiment of the invention.

In another exemplary embodiment of the present invention, the intermediate reset voltage is determined by using conventional circuitry and changing the intermediate reset time, and without the need for special light-opaque pixels and power supply circuit. FIG. 9 is a timing diagram that depicts the operation of circuit 100 according to this embodiment of the invention. The timing diagram of FIG. 9 differs from the timing diagram of FIG. 8 in several respects. First, the circuit 100 in the timing diagram of FIG. 9, the image array 110 is read in two segments, first without the XDR technique enabled during time period 1001, and second with the XDR technique enabled during time period 1002. Second, circuit 100 does not have a power supply circuit 690, and therefore no control signals are provided for that circuit. Third, the time when the intermediate reset voltage is provided during the XDR technique, e.g., Trst, is substantially close to the time of the integration, e.g., Tint.

Figure 10:
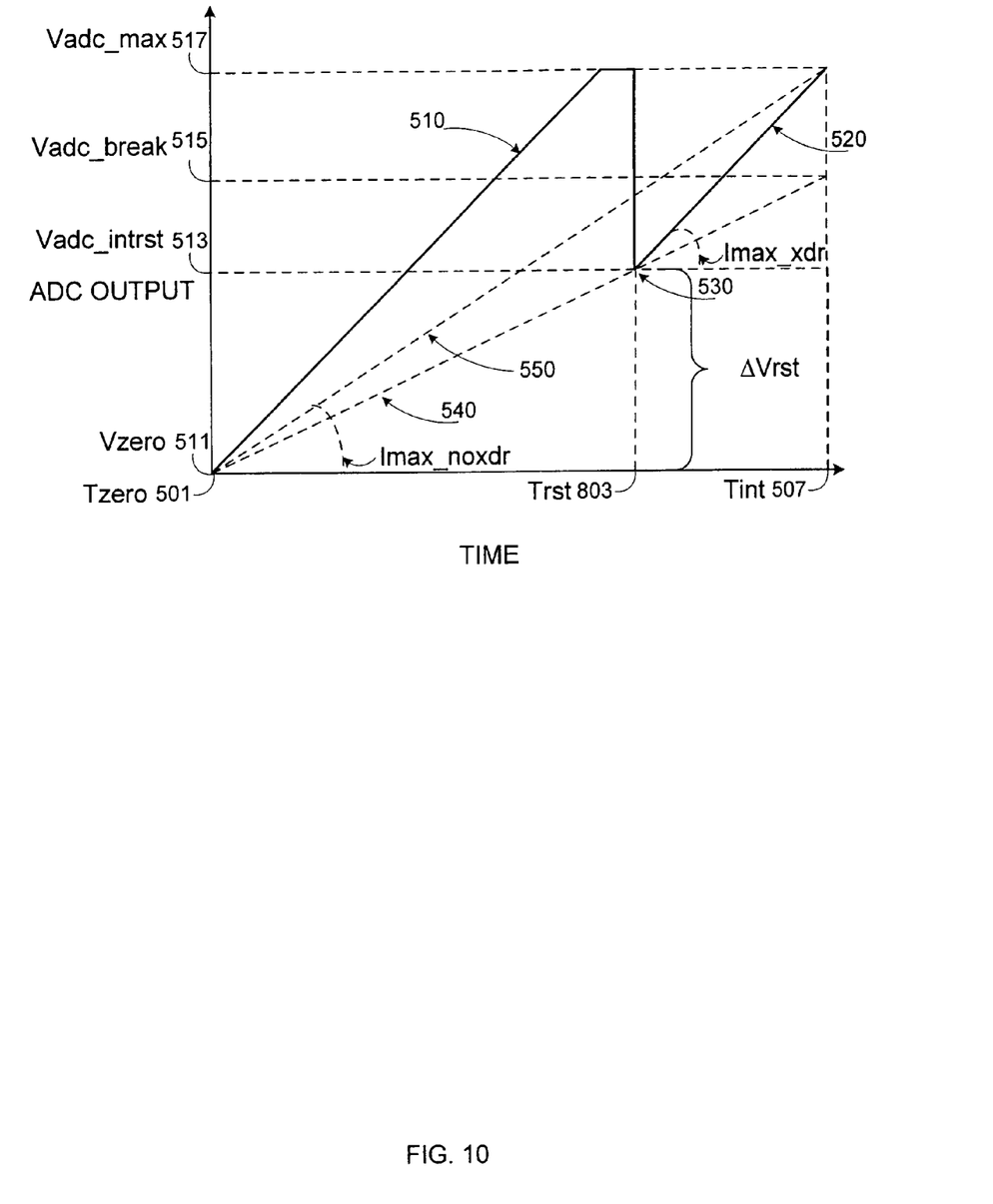
FIG. 10 is a graph depicting a knee-point curve comparing Vadc over time in accordance with a second embodiment of the invention.

The second segment 1002 of the readout from the image array is depicted in FIG. 10 where the knee-point curve is shown comparing Vadc over time. As seen in FIG. 10, Trst 803 is closer to Tint 507 so that the difference between Trst 803 and Tint 507 is minimized.

As indicated above, in this exemplary embodiment of the invention, the kneepoint is determined using a two-step process. In the first step of the process, an XDR technique is disabled and not employed, and the CMOS image array 100 (FIG. 1) is read in the conventional fashion and processed. The values, and possibly locations, of saturated pixels are recorded. For example, a pixel indicates a measured light intensity, after being processed by an ADC amplifier on a graduated scale from 0 to 1,023, where 1,023 is a saturated pixel. Then, a pixel having a measured light intensity level close in value to 1,023 is recorded, e.g., for example, those pixels having a measured light intensity level greater than 1,018. If the measurement of the pixels indicates that there are no pixels that are saturated, then the exposure is adjusted to force a number of pixels to have a value indicating that they are saturated.

In the second step of the process during time period 1002 (FIG. 9), the image array is read out again. During this read-out, an XDR technique is enabled. As indicated above in this exemplary embodiment, the Trst occurs just briefly before Tint. In a preferred embodiment, the Trst is substantially equal to Tint. The values are read from the pixels of the array and processed. The post-ADC processed signals taken in the second step of the process that correspond to the pixels identified in the first step of the process as saturated pixels in the first are compared to determined the difference in voltage output from these pixels in the first and second step of the process. The result of the comparison provides the ΔVrst. As described above with respect to Equation (2), once ΔVrst is determined, then Vadc_break can be calculated.

Figure 11:
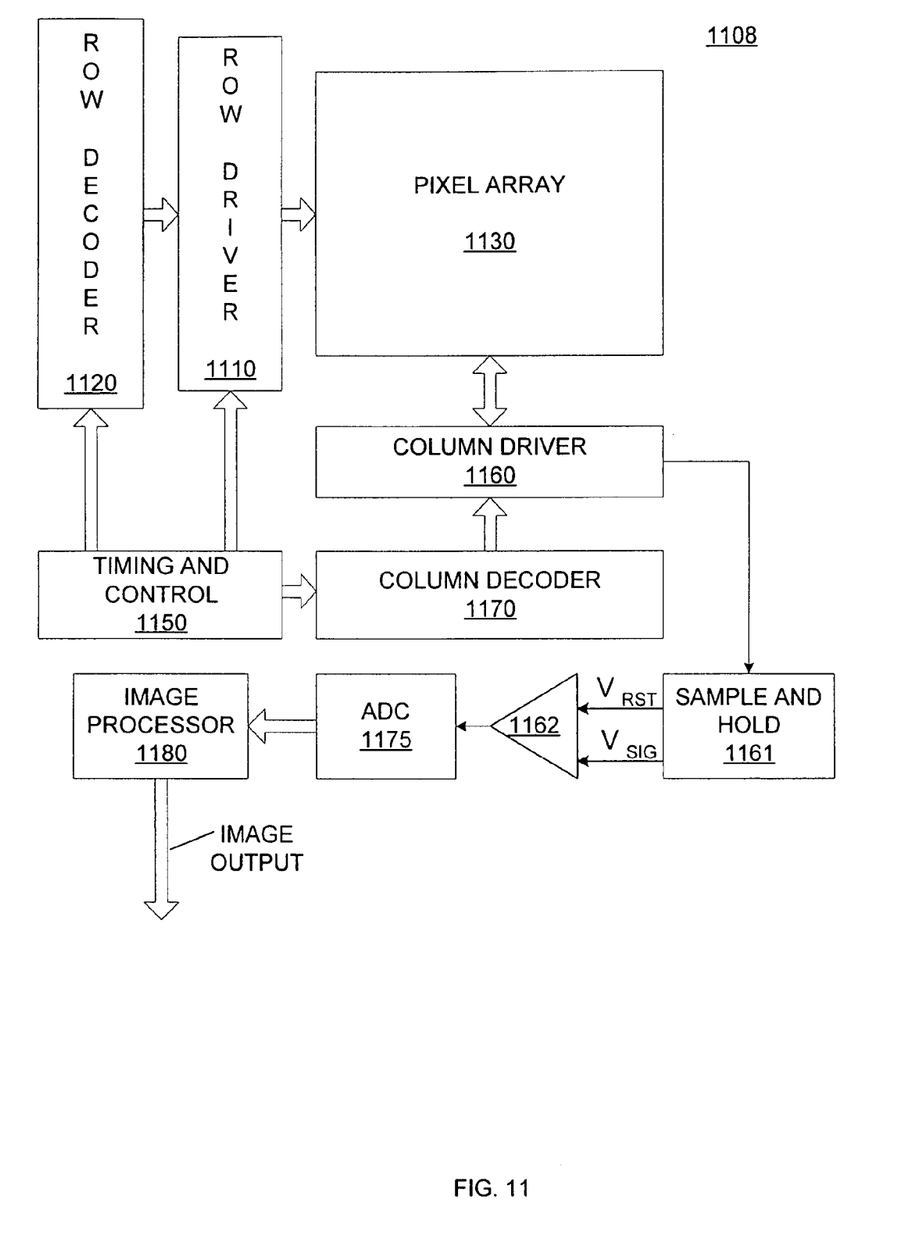
FIG. 11 is a block diagram representation of an imaging device in accordance with an exemplary embodiment of the invention.

FIG. 11 illustrates a block diagram of an exemplary imager device 1108 that may be used in accordance with an embodiment of the invention. Imager 1108 has a pixel array 1100 and row lines are selectively activated by a row driver 1110 in response to row address decoder 1120. A column driver 1160 and column address decoder 1170 are also included. The imager device 1108 is operated by the timing and control circuit 1150, which controls address decoders 1120, 1170. The control circuit 1150 also controls the row and column driver circuitry 1110, 1160. A sample and hold circuit 1161 associated with the column driver 1160 reads a pixel reset signal ($V_{rst}$) and a pixel image signal ($V_{sig}$) for the selected pixels. A differential signal ($V_{rst}-V_{sig}$) is produced by differential amplifier 1162 for each pixel. The differential signal is digitized by analog-to-digital converter 1175 (ADC). The analog-to-digital converter 1175 supplies the digitized pixel signals to an image processor 1180, which forms and outputs a digital image.

Figure 12:
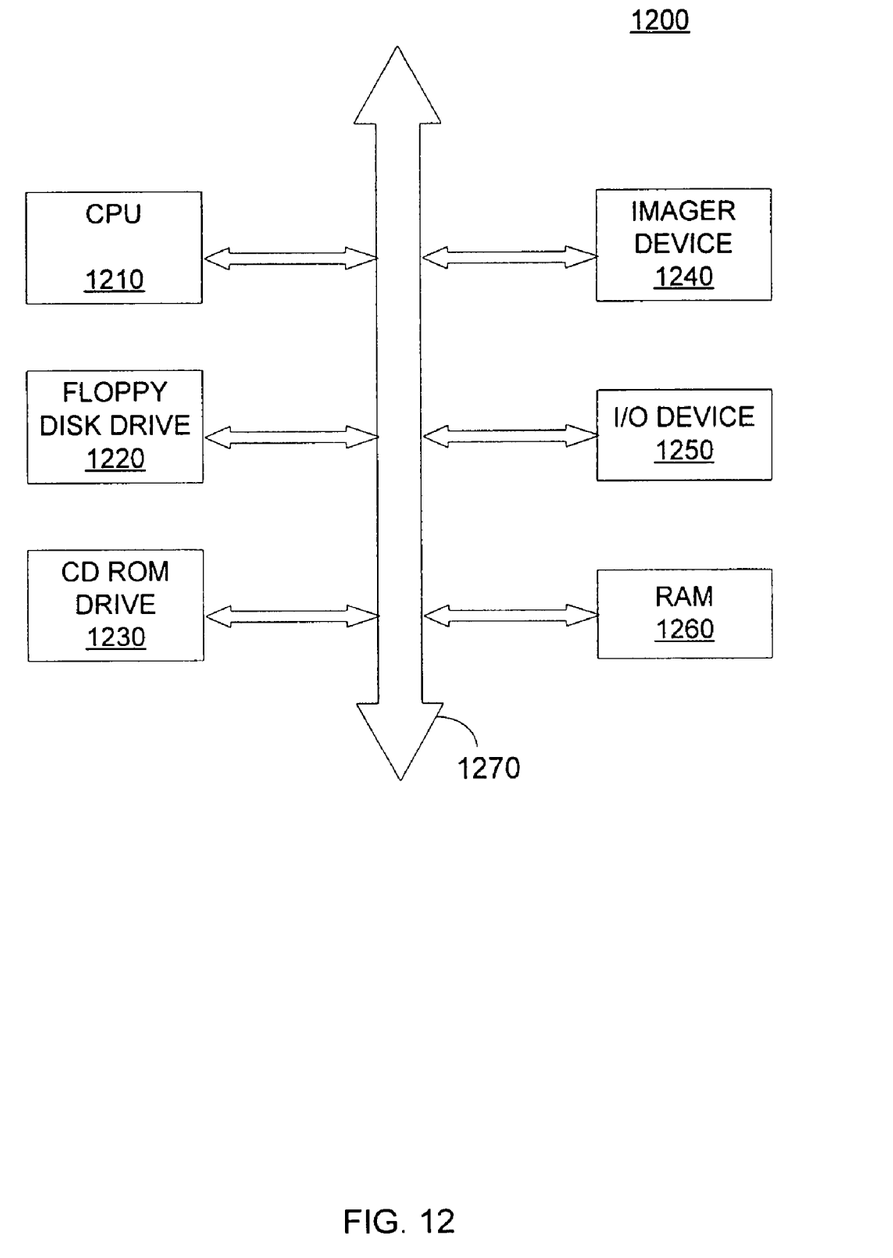
FIG. 12 is a block diagram representation of a processor-based system incorporating an imaging device in accordance with an exemplary embodiment of the invention.

The method and apparatus aspects of the invention are embodied in an imager device 1240 shown in FIG. 12, which provides an image output signal. The imager device 1240 may be, for example, the imager device 1108 of FIG. 11. The image output signal can also be applied to a processor system 1200, also illustrated in FIG. 12. A processor based system, such as a computer system, for example, generally comprises a central processing unit (CPU) 1210, for example, a microprocessor, that communicates with one or more input/output (I/O) devices 1250 over a bus 1270. The CPU 1210 also exchanges data with random access memory (RAM) 1260 over bus 1270, typically through a memory controller. The processor system may also include peripheral devices such as a floppy disk drive 1220 and a compact disk (CD) ROM drive 1230 which also communicate with CPU 1210 over the bus 1270. Imager device 1240 is coupled to the processor system and includes a pixel storage and readout circuit as described along with respect to FIG. 6.

While the invention has been described and illustrated with reference to specific exemplary embodiments, it should be understood that many modifications and substitutions can be made without departing from the spirit and scope of the invention. For example, although described with reference to a 3T pixel, the invention is not so limited. Further, although described with reference to CMOS active pixel arrays the invention is not so limited. Accordingly, the invention is not to be considered as limited by the foregoing description but is only limited by the scope of the claims.

What is claimed as new and desired to be protected by Letters Patent of the United States is:

1. A method of operating a pixel of a pixel array, said pixel including a reset transistor having a gate, said method comprising:
   applying a first reset voltage to said gate of said reset transistor, said reset transistor affecting a charge at a charge storage area of said pixel, said first reset voltage having an amplitude sufficient to cause conduction of said reset transistor;
   sampling a first voltage signal at said charge storage area of said pixel after said first reset voltage is applied;
   applying a second reset voltage to said gate of said reset transistor, said second reset voltage having an amplitude sufficient to cause conduction of said reset transistor, wherein one of said first and second reset voltages has a larger amplitude than the other;
   sampling a second voltage signal at said charge storage area after said second reset voltage; and
   determining a difference between said first and second sampled voltage signals.

2. The method of claim 1, wherein said first reset voltage is an intermediate reset voltage that has an amplitude that is less than a full reset voltage.

3. The method of claim 2, further comprising removing substantially all stored signal from said pixel prior to applying said first reset voltage.

4. The method of claim 3, wherein removing substantially all stored signal from said pixel further comprises coupling said charge storage area to a ground potential.

5. The method of claim 2, wherein said second reset voltage is said full reset voltage.

6. The method of claim 1, wherein said first reset voltage is a full reset voltage and said second reset voltage is an intermediate reset voltage that has an amplitude less than said full reset voltage.

7. The method of claim 1, wherein said determining further comprises:
   determining said difference in a differential amplifier.

8. The method of claim 7, further comprising:
   converting said difference into a digital form.

9. The method of claim 6, further comprising:
   applying a third reset voltage to said gate of said reset transistor to affect a charge at said charge storage area, said third reset voltage having an amplitude sufficient to cause conduction of said reset transistor.

10. The method of claim 9, further comprising, for each pixel in said pixel array:
    applying a first reset voltage to a gate of a reset transistor of said pixel; and
    sampling a first voltage signal from a charge storage area of said pixel.

11. The method of claim 10, further comprising:
    determining whether said respective first voltage signal of any pixel in said array indicates saturation; and
    if none of said respective first voltage signals indicate saturation, repeating said steps of applying said first reset voltage and sampling said first voltage signal for each of said pixels of said array.

12. The method of claim 11, wherein repeating said steps further comprises extending an exposure time of at least one pixel of said pixel array by adjusting a timing of applying said respective first reset voltage to said gate of said respective reset transistor of said at least one pixel.

13. The method of claim 1, wherein said determined difference corresponds to a kneepoint voltage of said pixel.

14. An imager comprising:
a pixel array including a pixel having a reset transistor with a gate;
a readout circuit for reading signals from said array; and
a control circuit for operating said pixel array and said readout circuit, said control circuit being configured to:
apply a first reset voltage to said gate of said reset transistor to affect a charge at a charge storage area of said pixel, said first reset voltage having an amplitude sufficient to cause conduction of said reset transistor;
apply a first sampling signal to sample a first voltage signal at said charge storage area of said pixel after said first reset voltage is applied;
apply a second reset voltage to said gate of said reset transistor to affect a charge at said charge storage area of said pixel, said second reset voltage having an amplitude sufficient to cause conduction of said reset transistor, wherein one of said first and second reset voltages has a larger amplitude than the other;
apply a second sampling signal to sample a second voltage signal at said charge storage area after said second reset voltage is applied; and
determine a difference between said first and second sampled voltage signals.

15. The imager of claim 14, wherein said first reset voltage is a full reset voltage, and said second reset voltage is an intermediate reset voltage that has an amplitude that is less than said full reset voltage.

16. The imager of claim 15, wherein said control circuit is further configured to:
apply a third reset voltage to said gate of said reset transistor to affect a charge at said charge storage area, said third reset voltage having an amplitude sufficient to cause conduction of said reset transistor.

17. The imager of claim 16, wherein said third reset voltage is a full reset voltage.

18. The imager of claim 16, wherein said control circuit is configured to apply a respective first reset signal to a gate of a respective reset transistor a respective first sampling signal to sample a respective first voltage signal to each pixel in said pixel array.

19. The imager of claim 18, wherein said control circuit is further configured to:
determine whether any of said respective first voltage signals of said pixels in said array indicate saturation; and
if none of said respective first voltage signals indicate saturation, applying said first reset voltage and said first sampling signal again for each of said pixels of said array.

20. The method of claim 19, wherein, when applying said first reset voltage and said first sampling signal again, said control circuit is configured to extend an exposure time of at least one pixel of said pixel array by adjusting a timing of said respective first reset voltage.

21. The imager of claim 14, wherein said first reset voltage is an intermediate reset voltage that has an amplitude that is less than a full reset voltage.

22. The imager of claim 21, wherein said second reset voltage is said full reset voltage.

23. The imager of claim 14, further comprising a source circuit configured to remove substantially all stored signal from said charge storage area by selectively coupling said charge storage area to ground through said reset transistor.

24. The imager of claim 23, wherein said control circuit is further configured to trigger said source circuit to couple said charge storage area to ground prior to applying said first reset voltage.

25. The imager of claim 14, wherein said determined difference corresponds to a kneepoint voltage of said pixel.

26. An imager comprising:
a pixel array;
a flood circuit for flooding said pixel, said flood circuit being selectively coupled to said pixel, wherein said flood circuit is configured to connect said pixel to ground; and
a reset circuit for resetting said pixel, said reset circuit configured to selectively couple said pixel to said flood circuit,
wherein said reset circuit is configured to provide the ground and first and second non-zero voltages to said pixel.

27. The imager of claim 26, wherein said first non-zero voltage is an intermediate reset voltage and said second non-zero voltage is a full reset voltage.

* * * * *